United States Patent [19]

Miller et al.

[11] Patent Number: 5,423,232
[45] Date of Patent: Jun. 13, 1995

[54] SELF-LUBRICATING GEAR SYSTEM

[75] Inventors: Frank S. Miller, Norwell; John F. Croto, South Weymouth, both of Mass.

[73] Assignee: IMO Industries Inc., Boston Gear Division, Quincy, Mass.

[21] Appl. No.: 141,381

[22] Filed: Oct. 22, 1993

[51] Int. Cl.⁶ .............................................. F16H 55/08
[52] U.S. Cl. .................................... 74/421 R; 74/462; 74/DIG. 10; 241/221; 241/236
[58] Field of Search ..................... 74/421 R, 461, 462, 74/DIG. 10; 241/221, 236

[56] References Cited

U.S. PATENT DOCUMENTS

| | | |
|---|---|---|
| 1,506,918 | 9/1924 | Soden-Fraunhofen ................ 74/462 |
| 2,017,139 | 10/1935 | Wood ................................ 74/461 X |
| 2,220,419 | 11/1940 | Meldahl ................................ 74/462 |
| 2,839,943 | 6/1958 | Caldwell et al. . |
| 3,010,338 | 11/1961 | Layton ..................... 74/DIG. 10 X |
| 3,081,648 | 3/1963 | Duer . |
| 3,175,110 | 3/1965 | Kohlhagen ....................... 74/461 X |
| 3,199,364 | 8/1965 | Dew . |
| 3,501,183 | 3/1970 | Stratienko . |
| 3,855,874 | 12/1974 | Honma et al. . |
| 4,041,794 | 8/1977 | Belot et al. . |
| 4,046,324 | 9/1977 | Chambers ....................... 241/236 X |
| 4,051,492 | 9/1977 | Laskin et al. ..................... 74/462 X |
| 4,202,644 | 5/1980 | Soussloff . |
| 4,345,851 | 8/1982 | Soussloff . |
| 4,367,053 | 1/1983 | Stratienko et al. . |
| 4,388,014 | 6/1983 | Wlodkowski et al. . |
| 4,589,300 | 5/1986 | Rouverol . |
| 4,615,640 | 10/1986 | Hosokawa . |
| 4,651,575 | 3/1987 | Morishita et al. . |
| 4,745,998 | 5/1988 | Stillin . |
| 4,824,281 | 4/1989 | Katsube . |
| 4,856,929 | 8/1989 | Smahlik et al. . |
| 5,059,464 | 10/1991 | Mikuni . |
| 5,156,794 | 10/1992 | Nakanishi et al. ............... 241/236 X |

FOREIGN PATENT DOCUMENTS 760091 11/1956 United Kingdom .................. 74/462
1161740 6/1985 U.S.S.R. ....................... 74/DIG. 10

OTHER PUBLICATIONS

Ferrell-Ross, *Materials Processing & Recovery* brochure, 1991.

Primary Examiner—Allan D. Herrmann
Attorney, Agent, or Firm—Hopgood, Calimafde, Kalil & Judlowe

[57] ABSTRACT

Disclosed is a high strength, self-lubricating, non-metallic gear which requires no lubrication when running with a metallic gear. The gears are secured to their shafts with keyless retaining devices, and the gear set is cut with a non-standard tooth form to provide superior power transmission performance.

20 Claims, 6 Drawing Sheets

SELF-LUBRICATING GEAR SYSTEM

FIELD OF INVENTION

The present invention relates to non-metallic gears and their use. More particularly, the present invention is a novel combination of a self-lubricating, non-metallic gear which is secured to its shaft with a keyless retaining device, and which gear is cut with a non-standard tooth form to provide in combination, superior power transmission performance.

BACKGROUND OF THE INVENTION

Non-metallic gear systems find many useful applications. The advantage of non-metallic gear systems over metal ones include their self-lubricating nature. Avoidance of the need for lubricating oil baths have many benefits. For instance, grain milling is traditionally processed on grinding apparatus referred to as "roll stands." The process involves repeated passage of grain between two counter-rotating, grinding rolls which crush the grain until the desired particle size is achieved. This process is suitable for flour and rice milling, and can also be extended to feed, sugar cane and coffee grinding. Although reference is made to the food industry, it is obvious that such grinders, run on self-lubricating gearing without using oil baths, also find useful application in any industry requiring grinding such as for example, pharmaceuticals.

Ordinarily, each pair of rolls is driven by an individual electric motor operatively connected to the roll stand. Alternatively, the roll pairs can be slaved off from a line shaft where a single larger motor provides power for several roll stands. Various devices can be used to transmit the rotating power to the rolls, such as chains and sprockets, V-belts and sheaves, timing belts and pulleys, or gearing, dependant upon the manufacturer of the roll stand.

Gear driven rolls are typically driven with metal-to-metal, helical gearing, but such systems require running in oil baths which is not preferred, especially in the food industry where contamination is a constant hazard to avoid. The primary source of contamination is from the need for constant changing of the oil and other maintenance work associated with the oil baths.

Additionally, costly man-hours are needed for the oil change and maintenance and the spent oil is itself a toxic waste needing expensive disposal. All of these problems can be avoided with self-lubricating gearing.

Sprocket driven systems are also known and also require the use of an oil bath. Non-gear, dry running systems requiring no oil baths, known in the art currently, involve added complexity and costly refinements to stand designs in order to achieve acceptable counter-rotating rolls. Thus, there is a need in the art for a dry running, gear driven system which offers the simplest stand configuration.

One advantageous aspect of the present invention is the provision of a simple, yet novel, dry, gear driven system. To this end is provided disclosure for a non-metallic gear in combination with a keyless retaining device for enhanced connection to shafts. The gear is additionally cut in non-standard tooth form which results in major changes to the lengths of action for approach and recess and reduces or eliminates high wear approach action associated with standard tooth forms.

Non-metal gears are known. For instance, U.S. Pat. No. 3,081,648 issued to Duer describes a gear mechanism made from thermosetting plastic material such as nylon for lubricant-free operation which alleges minimal wear between gear teeth. U.S. Pat. No. 3,199,364 issued to Dew describes a gear in which the toothed rim portion is said to consist of nylon which is claimed to have high impact strength and alleged self-lubricating qualities. However, these earlier attempts at producing practical non-metal gears were not successful as such gears tended to wear rapidly.

Described and claimed hereinbelow is a novel combination of select non-metal material gears which require no lubrication when used with a metal gear and the application of non-standard tooth geometry to achieve the desired sustained resistance to wear. Until the current disclosure, the industry's application for non-metallic gearing has been one of copying the same parameters as metal gearing.

Metal gearing designers generally use helical gears in oil baths to achieve improved strength and reduce noise. However, the benefits derived from helical gearing is offset by having to overcome axial thrust loads with more costly attachment designs. The present invention, in a preferred embodiment, uses non-metal, spur gearing where the design is simplified and offers other features such as reduced loads on bearings. However, the non-standard tooth configuration aspect of the present invention is applicable in both spur and helical gearing and is claimed as such hereinbelow.

Many methods for attaching components to drive shafts are known. For instance, U.S. Pat. No. 4,345,851 issued to Soussloff describes keyless mounting devices for anchoring machine elements to rotary shafts. U.S. Pat. No. 4,615,640 issued to Hosokawa also describes mounting devices for connecting "wheel-like" bodies to shafts. Typical problems encountered in such currently known devices include the need for close tolerances on the shaft and bores to achieve a fit that will not cause fretting corrosion or galling. However, these modifications cause the components to "freeze" to the shafts, making removal such as for maintenance very difficult.

Thus, there is a need in the art to provide improved non-metal gearing with superior shaft connections without the accompanying shortcomings and drawbacks of the prior art.

SUMMARY AND OBJECTS OF THE PRESENT INVENTION

Accordingly, it is an object of the present invention to provide non-metallic gears in a novel combination of a high strength, non-metallic gearing which is secured to its shafts with a keyless retaining device, and which is cut with a non-standard tooth form to provide superior power transmission performance when used in conjunction with metal gearing.

Another object of the present invention is to provide a self-lubricating, gear driven system which is a combination of a non-metallic gear with a keyless retaining device for enhanced connection to shafts, and which gear is cut in non-standard tooth form which results in major changes to the lengths of action for approach and recess and reduces or eliminates high wear approach action associated with standard tooth forms.

Another object is to provide a gear system of a high strength non-metal gear with modified tooth forms, metal pinion, and collet-like bushing, which is a non-lubricated gear system, is of a long wearing strong tooth design, has higher efficiency than standard gearing, and has reduced bearing loads.

Another object is to provide a gear system which conserves power, is easy to attach and remove, has quiet operation characteristics, and has increased shaft tolerance.

A further object is to provide a gear system with reduced operation noise, eliminated oil-lubrication requirement, and reduced maintenance time. These and other objects will become apparent hereinafter and in the claims.

The presently claimed gear system is designed for driving grinding roll stands, but is equally applicable in any situation requiring the avoidance of oil baths, and in situations where repeated adjustments in gearing is required to accomodate corresponding adjustments in the driven apparatus which requires facilitated removal and easy re-installation.

The present gear system, in a preferred embodiment, comprises a self-lubricating non-metal driver gear engaged to a metal driven gear, which provide power to drive roll stands. A keyless locking device is used for securing the plastic driver and metal driven gears to their respective shafts. Currently, the vast majority of gear systems utilize a keyway/key type locking device to secure gears to shafts. However, this type of locking means is prone to fretting corrosion. The present invention utilizes keyless locking means which, in addition to avoiding fretting corrosion, provides ease in removal and reattachment of gears from and to the shaft to make routine adjustments.

Examples of available keyless locking devices include products sold under the trade names, Trantorque (Fenner Manheim), ETP Bushing (Zero-Max/Helland) and Locking Assemblies (Ringfedder).

The non-metal gears of the present invention are said to be "self-lubricating" which essentially means that no lubrication is needed such as for metal-to-metal gear drives. Some suitable plastics include nylon 12, lauramid, nyaltron, delrin, phenolic composites or combinations thereof.

The following definitions are provided for clarity in the subsequent specification and claims.

An "addendum" as the word is used herein, describes that portion of the gear tooth from the pitch point to gear tip. FIGS. 4 and 5 show various pitch points. The pitch diameter is the length between two opposing pitch points.

The "dedendum" as the word is used herein, is the portion of the gear tooth from pitch point to the bottom of the tooth.

The "standard tooth form" as the phrase is used herein, refers to teeth on engaging gears where the gear and pinion have equal addenda. Standard tooth forms have power transmission characteristics which have approximately equal lengths of tooth contact for approach and recess (see FIG. 4). This characteristic allows gearing, produced with standard tooth forms, to transmit power in a direction from pinion to gear or vice versa, equally well.

In standard involute gear forms, the driver shows the highest wear in the approach portion of the line of contact. This is primarily due to higher frictional loads on the contact surfaces. Frictional loads are higher as the gearing surfaces move inward on each other or converge (called approach action). As the contacts pass through the pitch point, the frictional loads move outward from each other or diverge. The frictional loads are lower in the diverging (recess) portion.

Frictional forces create surface abrasion stress which results in surface wear. Therefore, this rate of wear is higher in the approach portion of contact than the recess portion.

In the present invention, a non-standard, modified tooth form is utilized (see FIG. 5). The modified tooth form, described in the present embodiments, changes the addendum size of the driver and driven gears. By increasing the driver addendum 6 (see FIG. 5) and decreasing the driven addendum 6' by an equal amount, the lengths of the line of contact for approach and recess are changed and adjusted.

By doubling the size of the driver addendum and reducing the driven addendum an equal amount, or to zero (0), the approach portion can be entirely eliminated, converting it into an all recess action. However, tooth modification to addenda can occur in any proportion, depending upon what the desired Maximum achievement of features is at an all addendum driver 7 (see FIG. 5) and an all dedendum driven 8.

Modifications additionally increases the base thickness of the driver gear and increases its load carrying capacity. Modifications to the driven or metallic gear reduces its base thickness and, therefore, reduces its load carrying capacity. These changes result in two gears with more equal load carrying capacity and increases the overall capacity of the gear set (compare items 10 and 10' in FIGS. 4 and 5, respectively).

In mill grinding applications and applications where the direction of power is known and maintained and additionally where non-metallic, non-lubricated, gearing is required, the modifications produce improved performance over standard tooth gearing. The tooth modifications described can be applied to spur or helical gearing and maintain the same features and benefits.

DETAILED DESCRIPTION OF A PREFERRED EMBODIMENT

Figure 1:
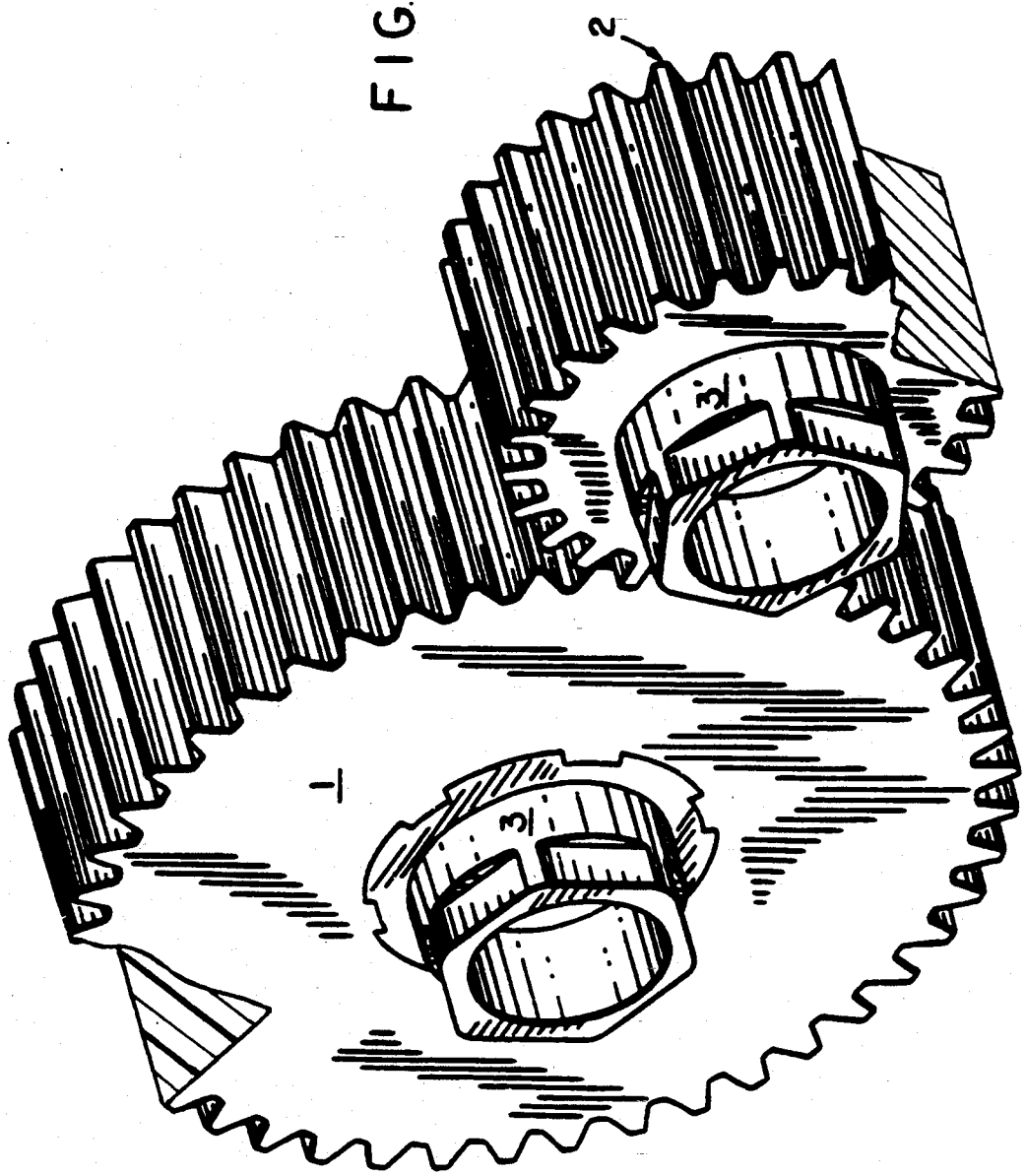
FIG. 1 is a perspective view of the gear system of the present invention. Depicted is an embodiment showing a non-metal, spur gear engaged to a metal, spur gear. Both gears are shown with the locking device of the present invention in place within the gears.
Figure 2:
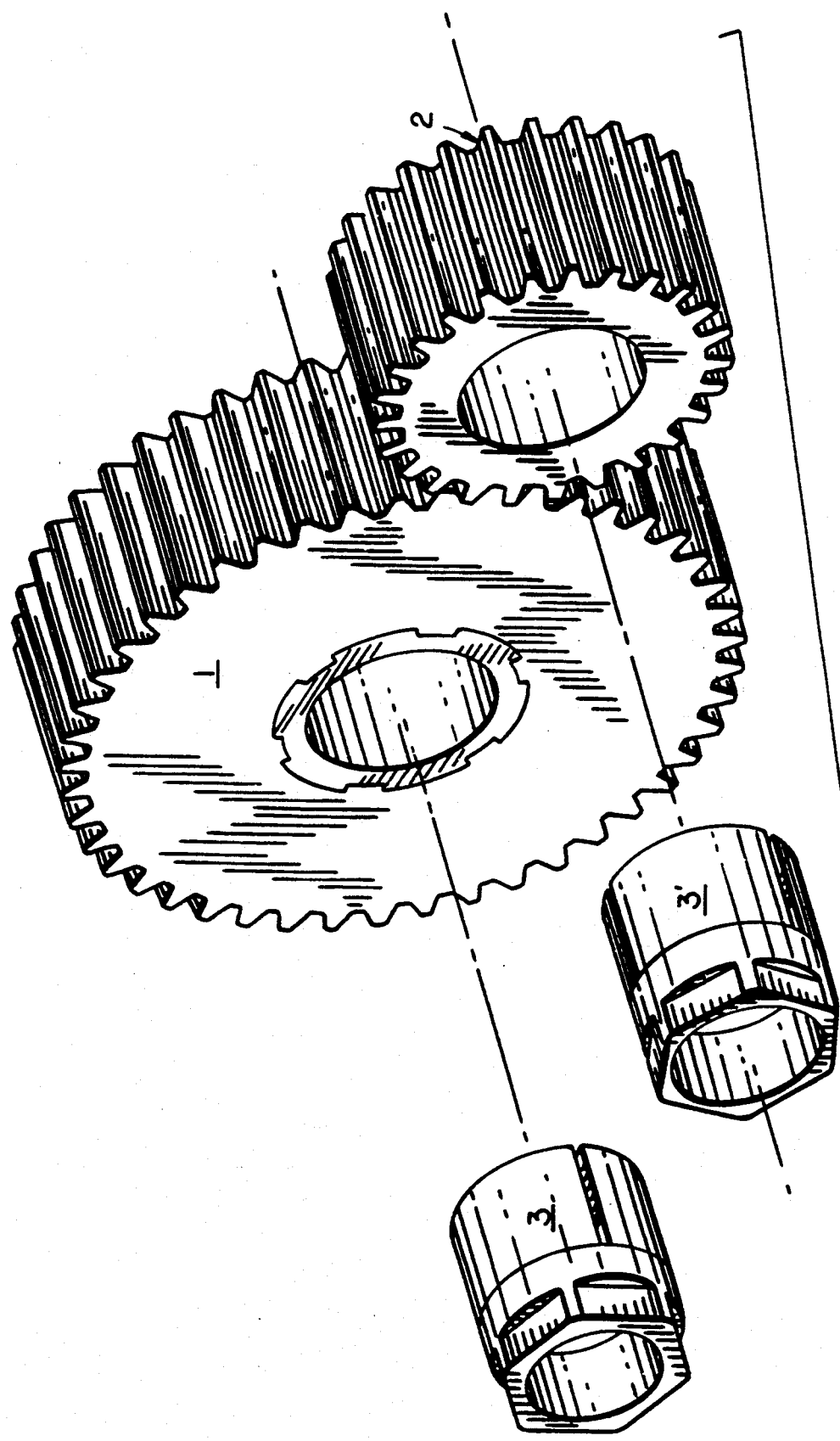
FIG. 2 is another perspective view of the gear system of the present invention, showing the locking device of the present invention separate from the gears.
Figure 3:
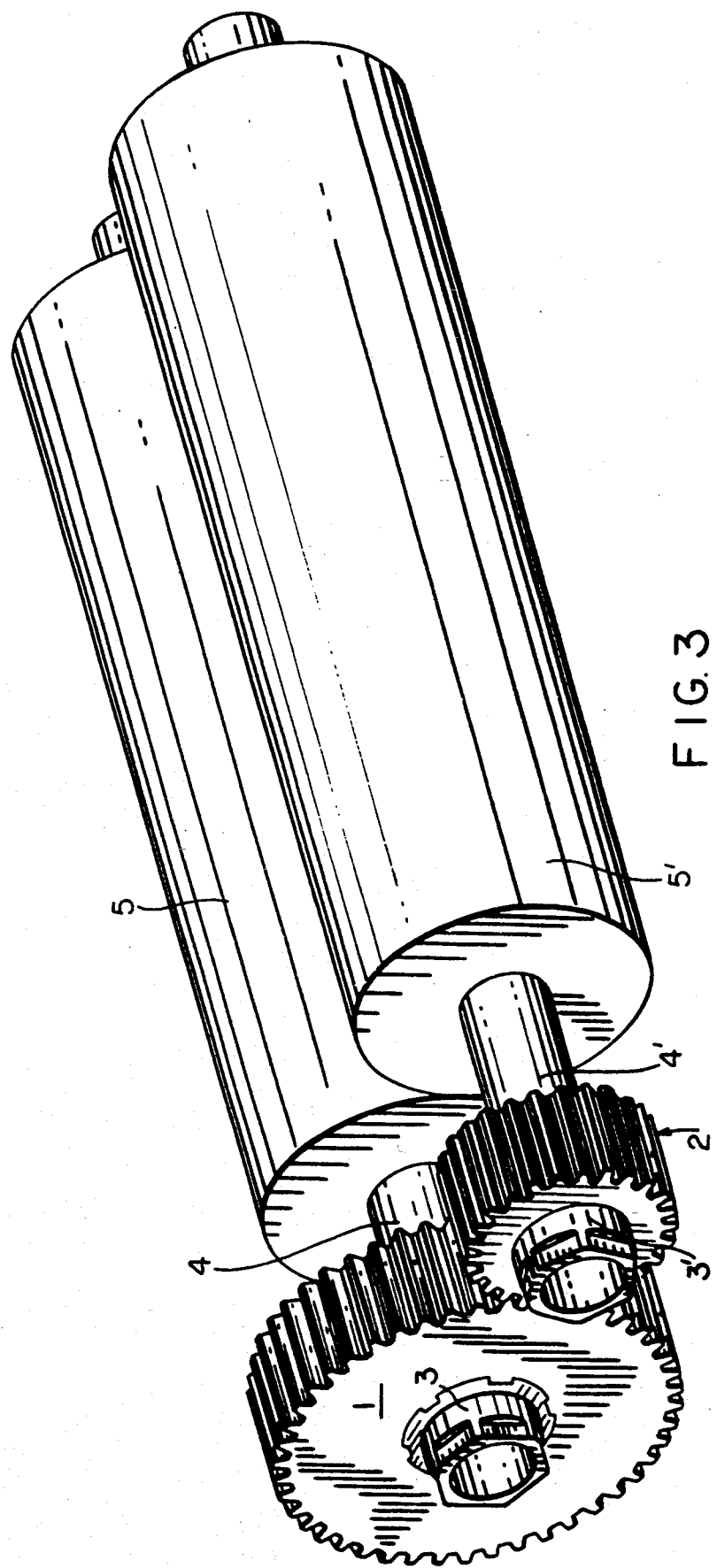
FIG. 3 is a perspective view of the gear system of the present invention shown attached to roll stands which comprise shafts 4 and 4' and rolls 5 and 5'.

Referring to FIG. 1, a non-metal, spur gear 1 is shown engaged to a metal, spur gear 2. Both gears are shown with the locking device 3 and 3' in place within a central hub. FIG. 2 shows locking device 3 and 3' disengaged from gears and 2. The embodiment depicted here is an expandable collet-type bushing which can lock the gears to the shaft without fretting corrosion and is, thus, quick and simple to install or remove. Examples of such locking devices include those disclosed in U.S. Pat. No. 4,202,644 issued to Soussloff. Such devices require only a single item adjustment and is effective over a broad tolerance range, unlike other known connecting devices which require a plurality of adjusting items to achieve an adequately tight connection.

Gear sets were produced for evaluation using new plastic materials and modified tooth forms. The modifications made were gearing concepts which would reduce wear, increase tooth strength in the plastic material and run quieter than standard tooth forms. The tooth modifications, commonly called recess action, can only be utilized in applications where the direction of power transmission is known and therefore not commonly used in industry for standardized gearing.

Steel gears like those used in printing presses can cause many headaches. In action, they are noisy, susceptible to corrosion, and require regular lubrication. If users cannot lubricate the gears, or if shock and vibration wear then down, their life span can become very short.

While it cannot withstand the high loads and temperatures that steel gears handle, the plastic-metal composite gear used in the presently described embodiment, is suitable for a wide variety of projects. In many of these applications, the plastic-metal gear requires no lubrication at all.

A cast Nylon 12 product known as lauramid (Intech Corp., Closter, N.J.) the plastic used in the presently described preferred embodiment, has a dense, homogeneous, crystalline structure. Other plastics have pockets of crystal embedded in an amorphous mass, which result in more inaccuracy because the machining tool hits pockets of different densities. The uniform density of lauramid allows users to machine it into as perfect a plastic gear as obtainable.

The size and physical properties of Nylon 12G gears remain relatively stable, the gears don't undergo the internal stresses experienced by Nylon 6 gears. This characteristic means that power-Core gears can last as much as three times longer than Nylon 6 gears.

The metal part of the gear, its central portion, or hub, can be made of cold rolled steel, stainless steel or aluminum. A gear's hub performs several important functions. Ordinarily, keyways cut into it allow users to attach the gear to shafts with keys. And once the gear is in place, the hub absorbs forces otherwise transmitted to the non-metal part of the gear that might cause the plastic to break.

Hubs are usually cut from a hexagonal steel bar. The corners of the hex are machined off to prevent any stress risers later on. A number of grooves cut into the hex ensure axial stability and firm plastic-metal attachment. After workers complete these production steps, they place the hub into a mold and pour hot, liquid lauralactam resin in with it. An oven receives the mold and its contents, and controls the plastic's cooling temperature.

About 24 hours, workers can machine the gear blank into its final shape. The non-metal gears of the present invention absorb vibration better than steel gears. Among other things, this behavior means that they run much more quietly than their all-metal counterparts. Replacing steel gears with non-metal gears reduces noise by an average of 6 decibels.

As for lubrication, if the outer surface of the present non-metal gear achieves a tangential speed of 5 meters per second or less, the gear requires no lubrication unless the flank load is excessive. Thus, little or no lubrication is required.

If its speed exceeds 5 meters per second, the gear must be lubricated. For gear speeds between 5 and 10 meters per second, engineers can specify grease as the lubricant. For speeds greater than 10 meters per second, users must lubricate the gear with oil. Even when they require lubrication, the present non-metal gears have an edge over steel gears. Steel gears have to be lubricated at regular intervals, but non-metal gears are more forgiving, if lubrication is occasionally skipped, the consequences are not noteworthy.

In many cases, non-metal gears last longer than steel gears. The non-metal gears significantly outlast metal gears in situations where gears cannot be regularly lubricated, or where vibration and shock cause excessive wear. Depending on the size and type of metal hub, non-metal gears can be seven times lighter than all-metal gears. Obviously, this weight reduction represents a great advantage when workers must change out a large gear. Thus, the need for manpower is reduced.

Figure 4:
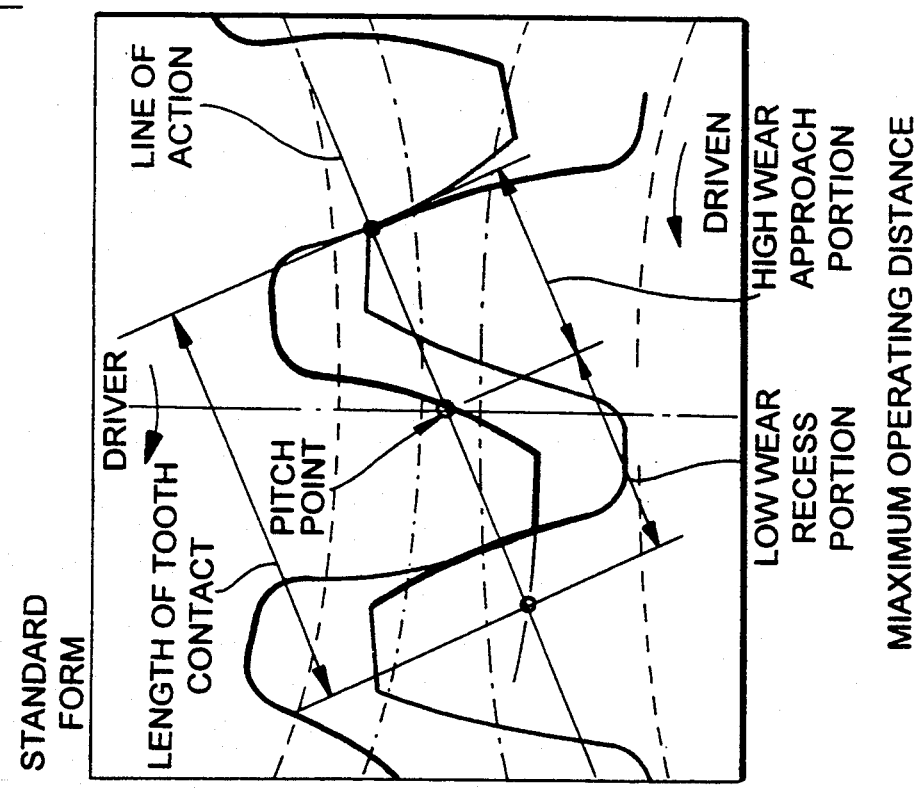
FIG. 4 is a close-up, side view of the prior art, standard tooth form showing non-metal teeth engaging metal teeth.
Figure 4:
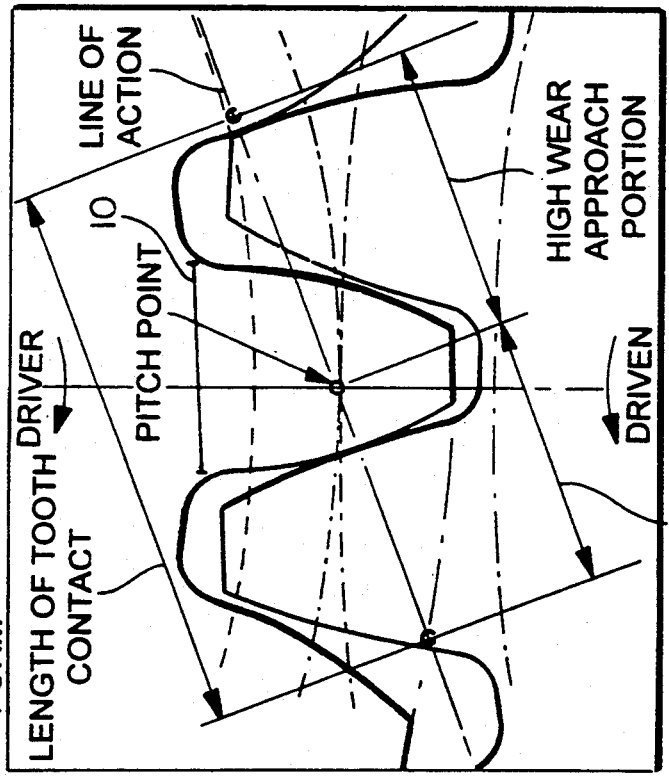
Figure 5:
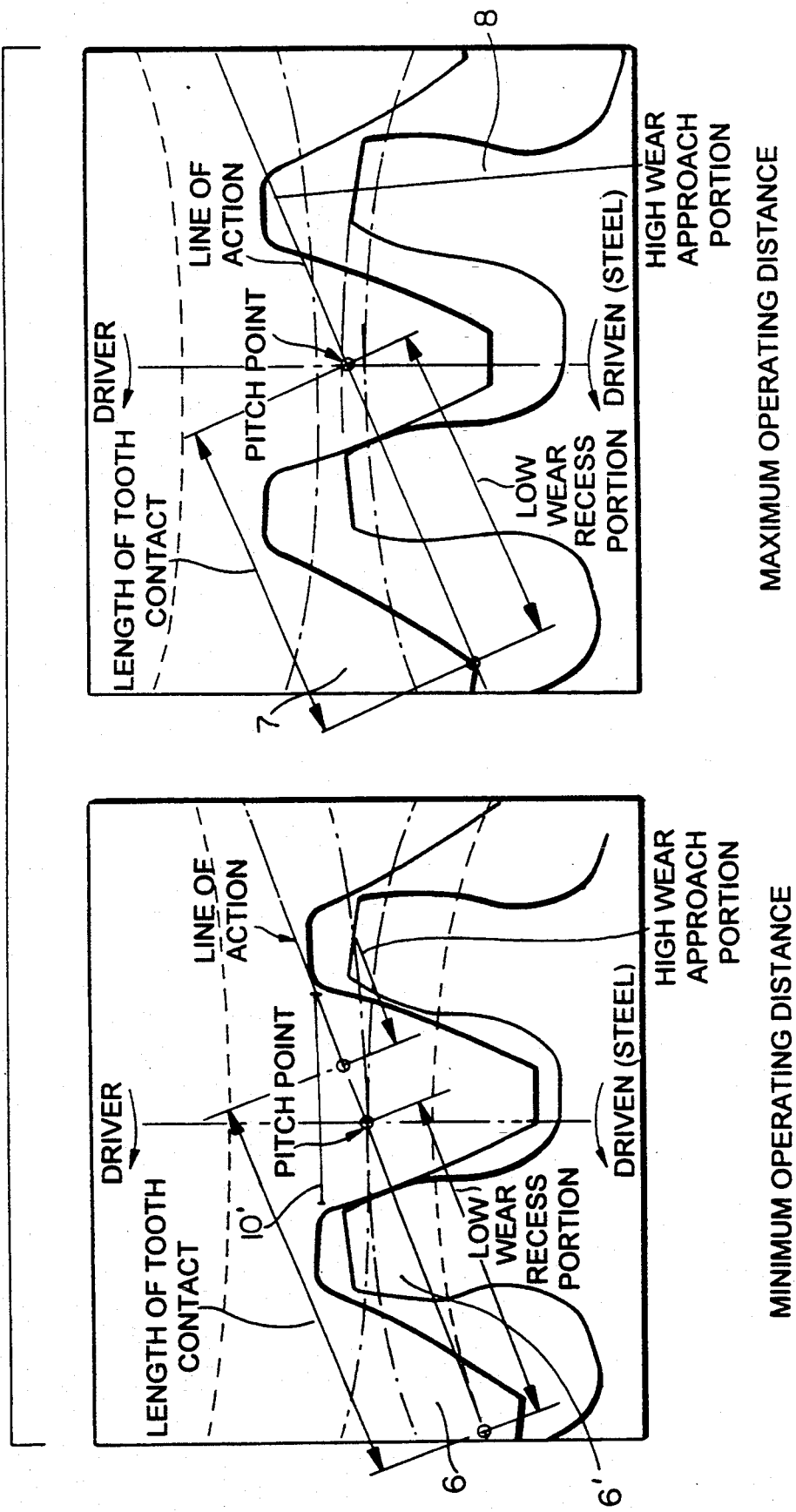
FIG. 5 is a close-up, side view of the present invention showing the tooth form of the present invention, and also shows the improved non-metal/metal teeth engaging arrangement.
Figure 6:
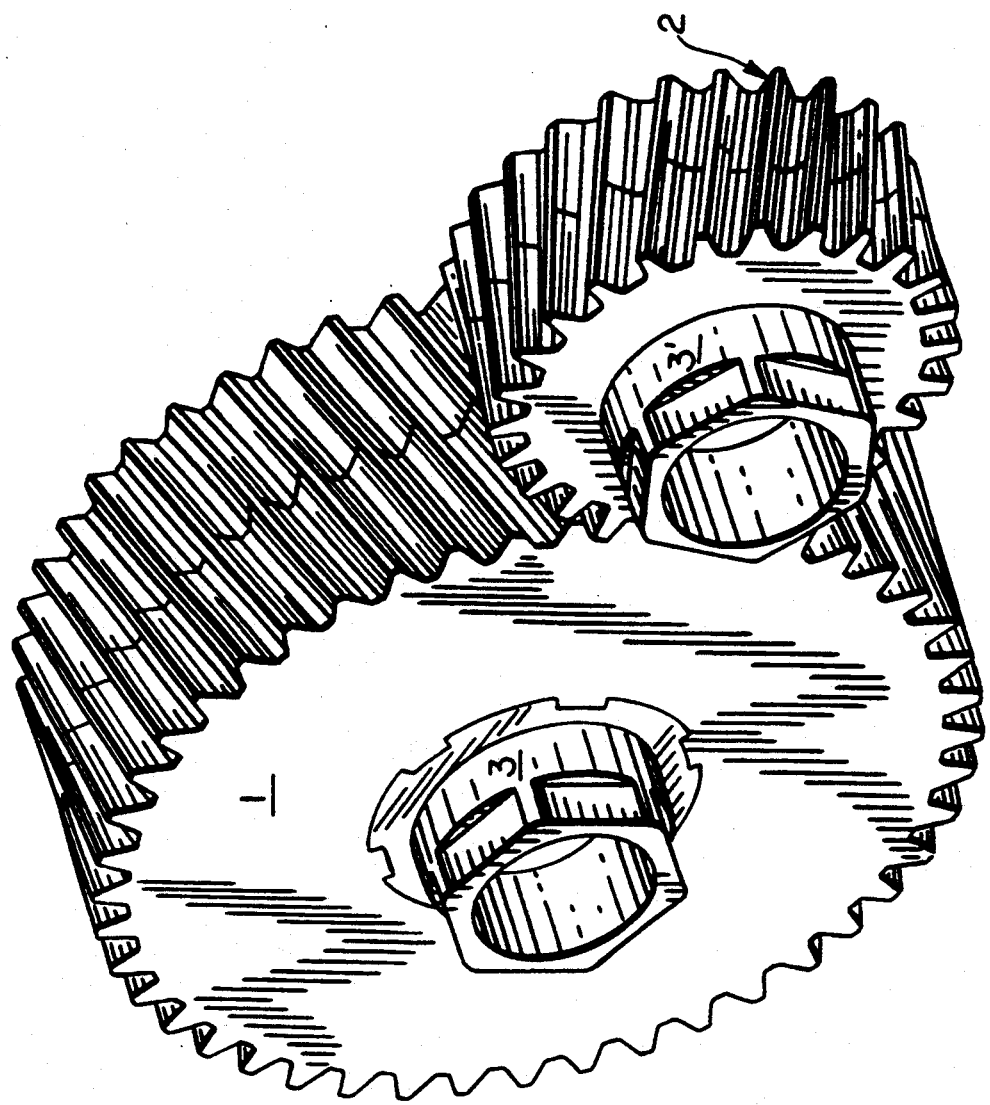
FIG. 6 is a perspective view of the gear system of the present invention. Depicted is an embodiment showing a non-metal, helical gear engaged to a metal, helical gear.

Referring to FIG. 5, the modified tooth forms, as described, are produced with the same equipment and tooling used to produce standard tooth forms (see FIG. 4). These features can be made in a driver by increasing the gear outside diameter size the desired amount above the pitch diameter, hobbing or cutting to a standard full depth while cutting the same numbers of teeth as standard tooth form.

The driven is achieved in a similar manner by decreasing its gear blank diameter the desired amount of addendum modification and hobbing or cutting a standard tooth depth with the same number of teeth as standard form.

While the preferred embodiment has been described, one skilled in the art could modify the various aspects of the invention and derive a combination resulting in similar function as the presently described invention. All such modifications are contemplated as being within the scope and spirit of the presently claimed invention.

What is claimed is:

1. A gear system for driving roll stands, comprising:
 a. at least one non-metal driver gear;
 b. a driven gear;
 c. keyless locking means for securing said gears to shafts; and
 d. said driver gear having teeth with increased addendum relative to standard gearing, and said driven gear having teeth with addendum decreased in magnitude equal to said increase in addendum of said driver gear, all relative to standard gearing.

2. The gear system of claim 1, wherein said increase in driver gear addendum is two-fold relative to standard gearing, and said driven gear addendum is decreased in magnitude equal to said two-fold increase in addendum of said driver gear.

3. The gear system of claim 1, wherein said driver gear is an all addendum gear and said driven gear is an all dedendum gear.

4. The gear system of claim 1, wherein said driver gear has teeth which have increased base thickness relative to standard gearing.

5. The gear system of claim 1, wherein said driven gear has teeth which have reduced base thickness relative to standard gearing.

6. The gear system of claim 1, wherein said driver gear is comprised of a self-lubricating plastic.

7. The gear system of claim 6, wherein said driver gear is comprised of a self-lubricating plastic selected from the group consisting of nylon 12, lauramid, nyaltron, delrin, phenolic composites and combinations thereof.

8. The gear system of claim 1, wherein said driver gear and said driven gear are spur gears.

9. The gear system of claim 1, wherein said driver gear and said driven gear are helical gears.

10. A gear system for driving roll stands, comprising:
a. a self-lubricating plastic driver gear;
b. a metal driven gear;
c. keyless locking means for securing said gears to shafts; and
d. said driver gear having teeth with increased addendum relative to standard gearing, and said driven gear having teeth with addendum decreased in magnitude equal to said increase in addendum of said driver gear, all relative to standard gearing.

11. The gear system of claim 10, wherein said increase in said plastic driver gear addendum is two-fold relative to standard gearing, and said metal driven gear addendum is decreased in magnitude equal to said two-fold increase in addendum of said driver gear.

12. The gear system of claim 10, wherein said plastic driver gear is an all addendum gear and said metal driven gear is an all dedendum gear.

13. The gear system of claim 10, wherein said driver gear has teeth which have increased base thickness relative to standard gearing, and said driven gear has teeth which have reduced base thickness relative to standard gearing.

14. The gear system of claim 10, wherein said self-lubricating plastic gear is selected from the group consisting of nylon 12, lauramid, nyaltron, delrin, phenolic composites and combinations thereof.

15. The gear system of claim 10, wherein said driver gear and said driven gear are spur gears.

16. The gear system of claim 10, wherein said driver gear and said driven gear are helical gears.

17. A gear system for driving roll stands, comprising:
a. a self-lubricating plastic driver gear;
b. a metal driven gear;
c. a first keyless locking device for securing said driver gear to a first shaft and a second keyless locking device for securing said driven gear to a second shaft;
d. said driver gear having teeth with increased addendum relative to standard gearing, and said driven gear having teeth with addendum decreased in magnitude equal to said increase in addendum of said driver gear, all relative to standard; and
e. said driver gear having teeth with increased base thickness relative to standard gearing, and said driven gear having teeth with reduced base thickness relative to standard gearing.

18. The gear system of claim 17, wherein said self-lubricating plastic driver gear is selected from the group consisting of nylon 12, lauramid, nyaltron, delrin, phenolic composites and combinations thereof.

19. The gear system of claim 17, wherein said driver gear and said driven gear are spur gears.

20. The gear system of claim 17, wherein said driver gear and said driven gear are helical gears.

* * * * *